United States Patent [19]
Gomi et al.

[11] Patent Number: 5,445,235
[45] Date of Patent: Aug. 29, 1995

[54] LEGGED MOBILE ROBOT EQUIPPED WITH IMPACT ABSORBER

[75] Inventors: Hiroshi Gomi; Masao Nishikawa; Masato Hirose; Hideaki Takahashi; Takashi Matsumoto, all of Saitama, Japan

[73] Assignee: Honda Giken Kogyo Kabushiki Kaisha, Tokyo, Japan

[21] Appl. No.: 67,314

[22] Filed: May 26, 1993

[30] Foreign Application Priority Data

May 26, 1992 [JP] Japan .................. 4-158730

[51] Int. Cl.6 .................. B25J 19/00
[52] U.S. Cl. .................. 180/8.6; 180/8.1; 318/568.1; 318/568.12; 901/1; 901/9
[58] Field of Search .................. 180/8.1, 8.6; 318/568.1, 568.12; 901/1, 9

[56] References Cited

U.S. PATENT DOCUMENTS

| 4,834,200 | 5/1989 | Kajita .................. 180/8.1 |
| 5,255,753 | 10/1993 | Nishikawa et al. .................. 180/8.1 |

FOREIGN PATENT DOCUMENTS

| 0433096 | 6/1991 | European Pat. Off. . |
| 2821156 | 7/1980 | Germany . |
| 3527192 | 2/1987 | Germany . |
| 218122 | 10/1985 | Japan . |
| 62-97005 | 5/1987 | Japan . |
| 63-150176 | 6/1988 | Japan . |
| 3184782 | 8/1991 | Japan . |

OTHER PUBLICATIONS

Robotics Handbook—Oct. 20, 1990 Published By Corona Publishing Co., Ltd., Tokyo, Japan.

*Primary Examiner*—Mitchell J. Hill
*Attorney, Agent, or Firm*—Lyon & Lyon

[57] ABSTRACT

An impact absorber for a legged mobile robot having a body and two legs each connected to the body for absorbing impact arising when the robot collides with pipes or other objects in its walking environment so as to protect both the robot and the object. In a first embodiment, the impact absorber comprises a balloon disposed around the body and filled with air. When the balloon comes into contact with the object, it is deflated so as to absorb impact arising from the contact. In a second embodiment, the impact absorber comprises a cylinder fixed to the robot leg and a piston slidably disposed in the cylinder so as to define a chamber filled with an oil. A flat member is fixed to the rod of the piston and when it comes into contact with the object, the piston is thrust into the cylinder so as to absorb the impact. The impact absorber may be a resilient material coating on the robot to cushion the impact when the robot comes into contact with the object, or it may include air bags.

25 Claims, 10 Drawing Sheets

LEGGED MOBILE ROBOT EQUIPPED WITH IMPACT ABSORBER

BACKGROUND OF THE INVENTION

1. Field of the Invention

This invention relates to a mobile walking robot equipped with an impact absorber, more particularly to a legged mobile robot equipped with an impact absorber which absorbs impacts arising when the robot collides with pipes or other objects in its working environment, thereby protecting both the robot and the object collided with.

2. Description of the Prior Art

Legged mobile robots, in particular legged mobile robots using biped locomotion, are taught by Japanese Laid-open Patent Publication Nos. 62(1987)-97005 and 63(1988)-150176. A general discussion of robots, including legged mobile robots, can be found in Robotics Handbook, Robotic Society of Japan, Oct. 20, 1990.

Legged mobile robots, particularly those using biped locomotion, are expected to take over an increasing number of tasks previously handled by human beings. Among these are many jobs that require the robot to operate in a working environment including numerous pipes and other structural members. Moreover, many of the jobs envisioned for robots will require them to work in relatively tight quarters. If a robot working in such an environment should lose its balance and fall against a structural member such as a pipe or against a nearby human worker, it would be likely to damage the member or injure the worker. It might also damage and incapacitate the robot itself.

SUMMARY OF THE INVENTION

The object of this invention is therefore to overcome the aforesaid problem by providing a legged mobile robot equipped with an impact absorber which absorbs impacts arising during any collision that might occur between the robot and structural members or persons in the robot's working environment and thus minimizes damage/injury to both itself and the structural member or person with which it collides.

For realizing this object, the present invention provides a legged mobile robot equipped with an impact absorber, comprising a member which is displaced or deformed from an initial state, when reaction force other than that from the ground on which the robot walks acts on the robot, so as to absorb impact arising therefrom.

BRIEF DESCRIPTION OF THE DRAWINGS

The above and other objects and advantages of the invention will be more apparent from the following description and drawings, in which:

FIG. 3 is a front view of the robot of

FIG. 1 showing its structure in more detail and impact absorbers equipped thereat according to a first and a second embodiments of the invention;

DETAILED DESCRIPTION OF THE PREFERRED EMBODIMENTS

First, taking a biped robot as an example, a legged mobile robot itself will be explained.

Figure 1:
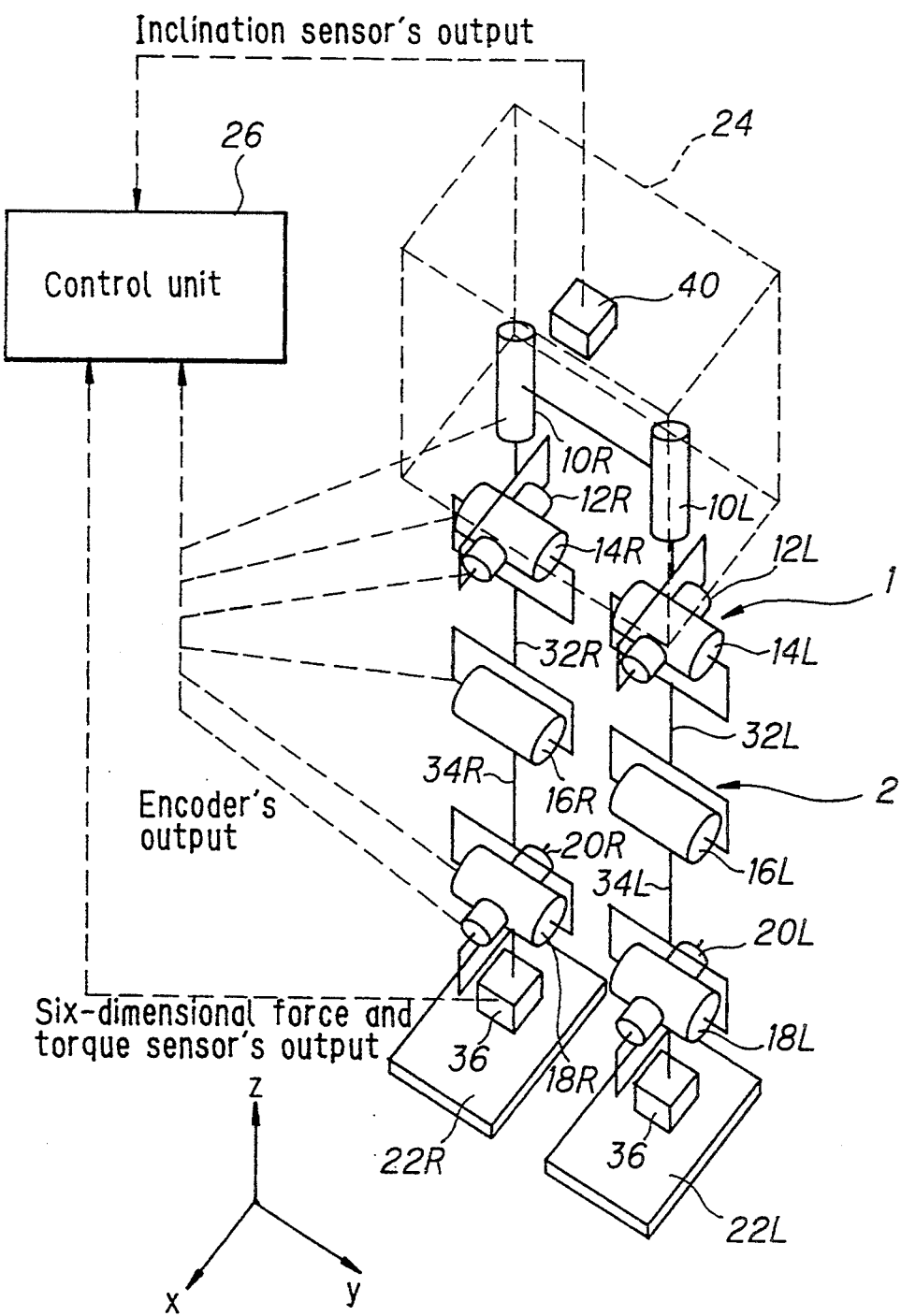
FIG. 1 is a schematic skeleton view showing the overall configuration of a legged mobile robot to be equipped with an impact absorber according to the invention taking a biped mobile robot as an example.

FIG. 1 is an overall skeleton view of a biped walking robot 1. The robot 1 has left and right legs 2 each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (rotation about the x axis), joints (axes) 14R, 14L for rotation at the hip in the roll direction (rotation about the y axis), joints (axes) 16R, 16L for rotation at the knee in the roll direction, joints (axes) 18R, 18L for rotation at the ankle in the roll direction and joints (axes) 20R, 20L for rotation at the ankle in the pitch direction. Feet 22R, 22L are provided at the lower end of this arrangement and a body (main unit) 24 is provided at the upper end, which houses electronic components such as a control unit 26 made up of a microcomputer and a battery for supplying current to joints motors or the like The hip joints in the foregoing configuration are constituted by the joints (axes) 10R(L), 12R(L) and 14R(L) and the ankle joints by the joints (axes) 18R(L) and 20R(L). The hip and knee joints are connected by thigh links 32R, 32L and the knee joints and ankle joints by crus links 34R, 34L. The legs 2 thus have six degrees of freedom, so that during locomotion the legs as a whole can be caused to execute the desired motion by driving the 6×2=12 joints (axes) to appropriate angle. The robot is thus capable of walking freely within three dimensional space. The joints are provided mainly with electric motors, as was mentioned earlier, and reduction gear mechanism for increasing motor torque. The structure of the joints is described in the assignee's earlier Japanese Patent Application No. 1(1989)-324,218 (Japanese Laid-Open Patent Publication No. 3(1991)-184,782) etc., and since it is not essential aspect of the present invention, will not be explained further here.

The individual ankles of the robot 1 shown in FIG. 1 are provided with a six dimensional force and torque sensor 36 of conventional design. By measuring the x, y and z force components Fx, Fy and Fz transmitted to the robot through the feet and also measuring the moment components Mx, My and Mz around the three axes, the six-dimensional force and torque sensor 36 detects whether or not the associated foot has landed and the magnitude and direction of the forces acting on the supporting leg. The sole of each foot is equipped at its four corners with touchdown switches 38, not illustrated in FIG. 1, of conventional design for detecting whether or not the foot is in contact with the ground. The top of the body 24 is provided with an inclination sensor 40 for detecting the robot body's inclination angle and angular velocity relative to z axis in the x-z and y-z planes. Each electric motor at the individual joints is provided with a rotary encoder for generating rotational information. And, although not illustrated in FIG. 1, the robot 1 is provided with a zero reference switch 42 for calibrating the output of the inclination sensor 40 and a limit switch 44 for a fail safe. The outputs of the sensors 36 and the like are sent to the control unit 26 in the body.

Figure 2:
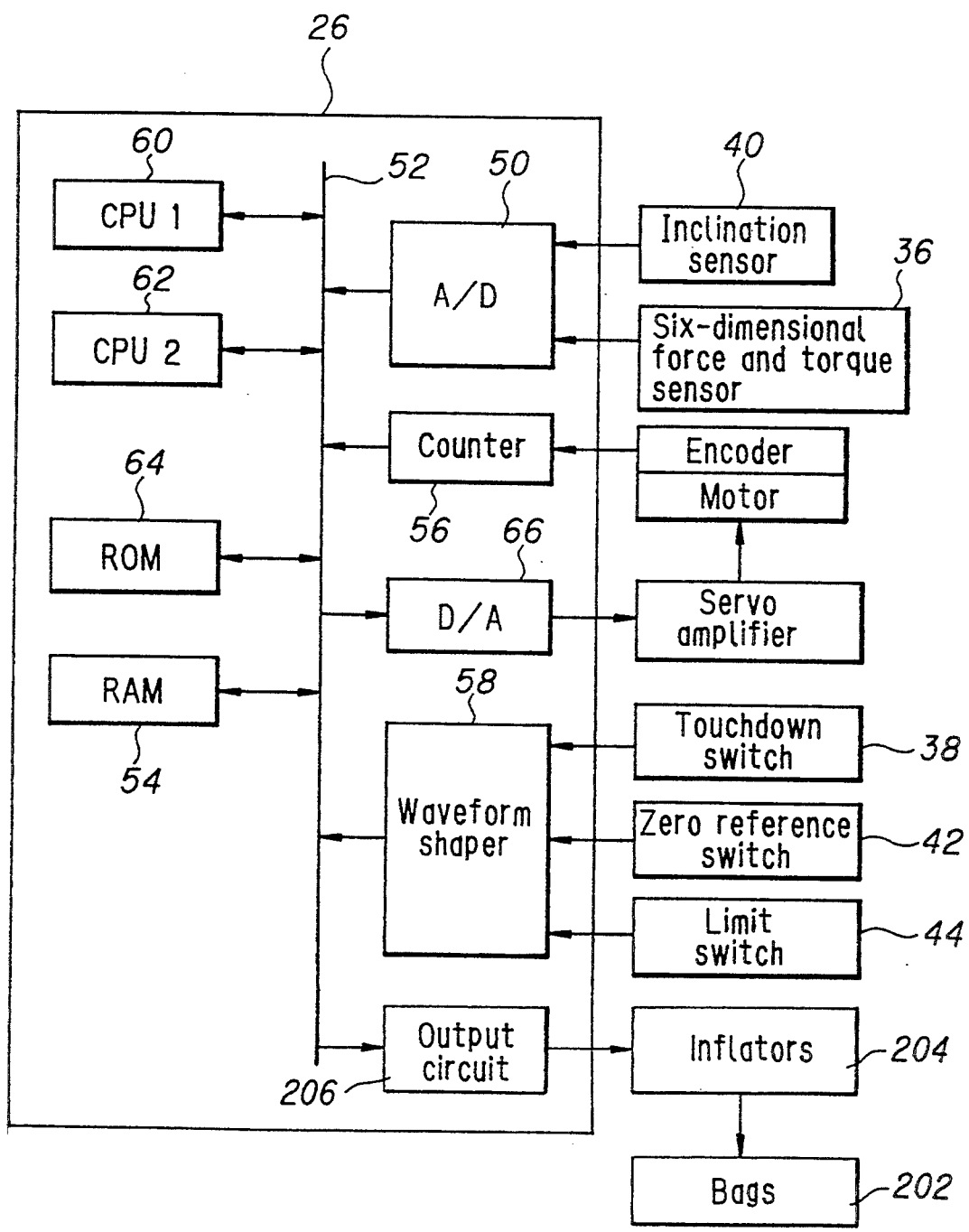
FIG. 2 is a block diagram showing the details of a control unit illustrated in FIG. 1.

As shown in the block diagram of FIG. 2, the control unit 26 has a microcomputer. The outputs from the inclination sensor 40 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while outputs of the touchdown switches 38 and the like are stored in the RAM 54 via a waveform shaper 58. The control unit has a first processor 60 and a second processor 62. The first processor 60 computes target joint angles on the basis of a waking pattern (gait) established in advance and stored in a ROM 64 and outputs the same to the RAM 54. The second processor 62 fetches the target joints angles and measured joint angles from the RAM 54, computes control commands of the individual joint motors and sends the same to associated servo amplifiers thereof via a D/A converter 66.

Figure 3:
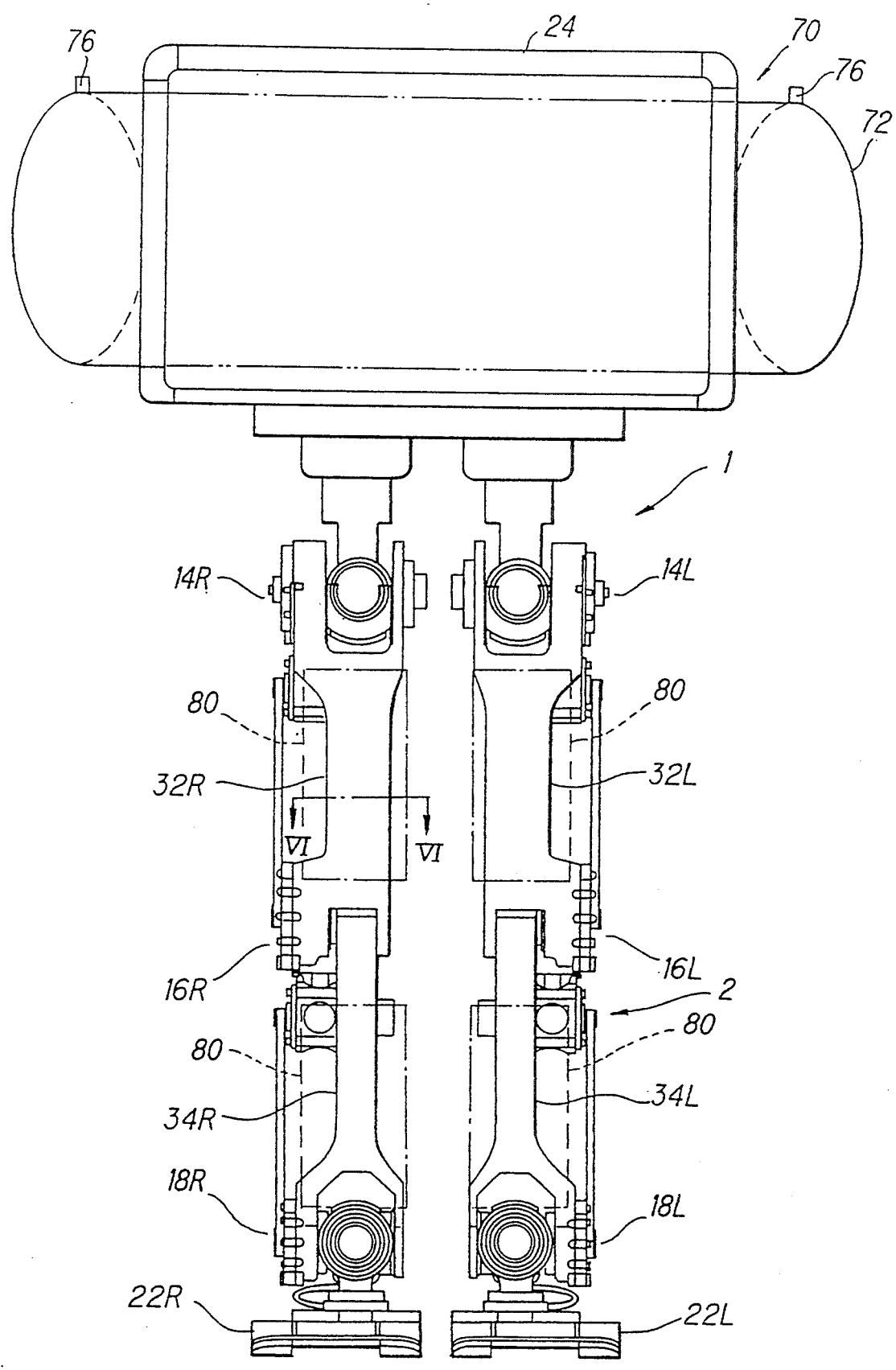
Figure 4:
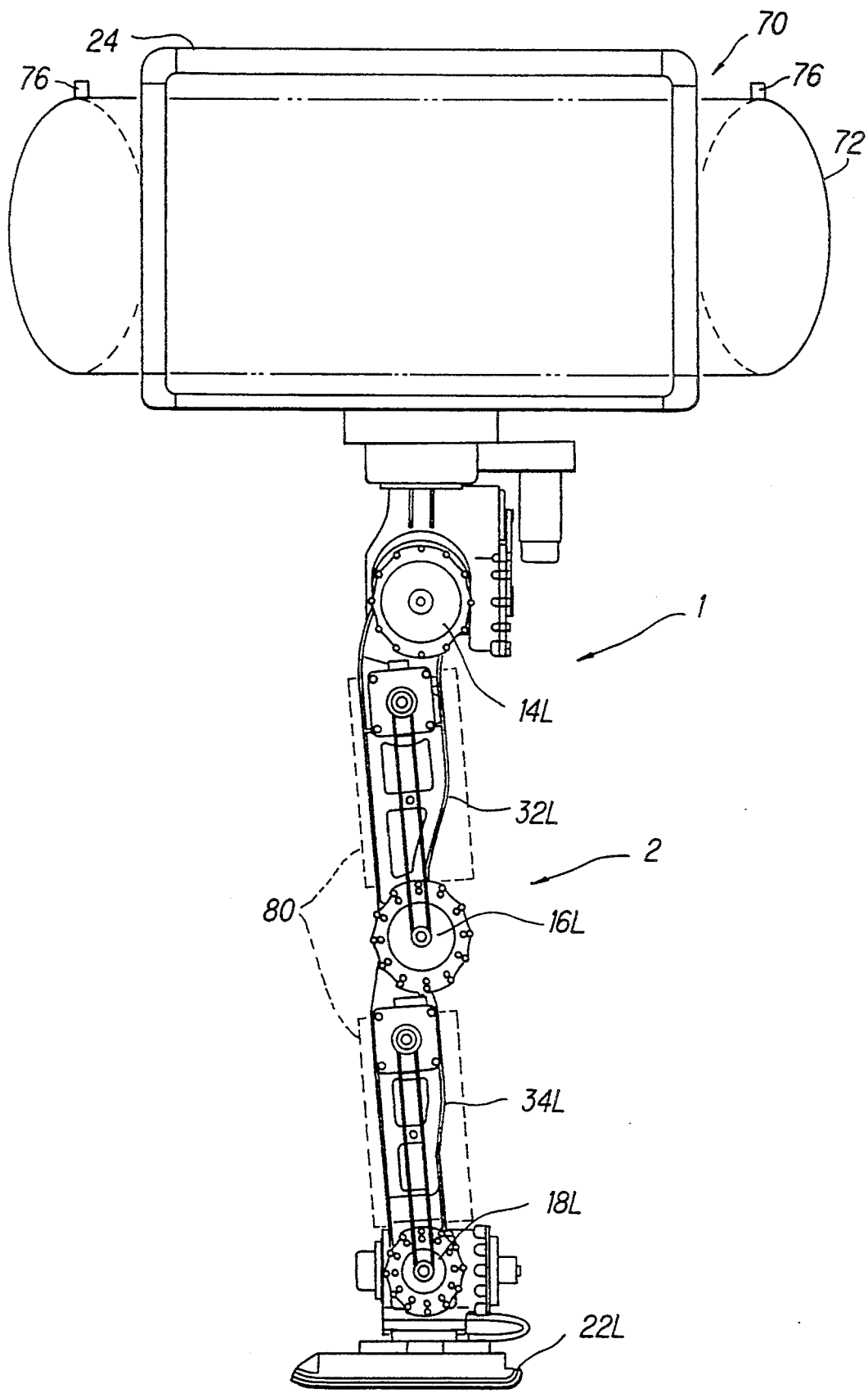
FIG. 4 is a side view of the robot of FIG. 3.
Figure 5:
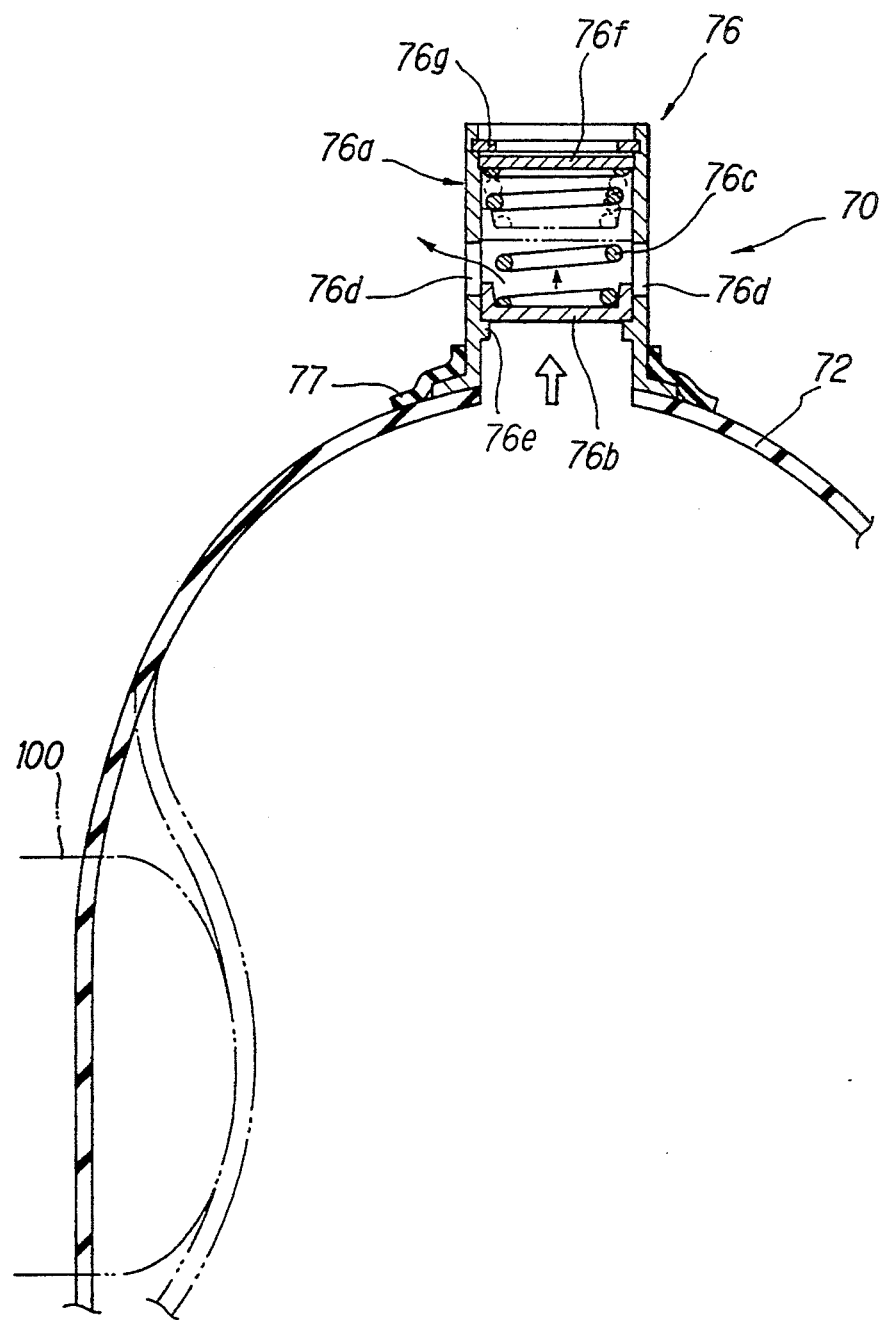
FIG. 5 is a partial sectional view showing the detailed structure of one impact absorber illustrated in FIGS. 3 and 4 according to the first embodiment of the invention.

FIGS. 3 and 4 are a front view and a side view of the robot 1 of FIG. 1 showing it in greater structural detail. What characterizes the present embodiment is that the robot's main unit 24, which is the member thereof projecting the farthest, is provided with an impact absorber 70. FIG. 5 is a sectional view of the essential part of the impact absorber 70, which will now be explained with reference to FIGS. 3 to 5. The impact absorber 70 comprises a doughnut-shaped balloon 72 which is inflated with compressed air and fitted snugly over the main unit 24 to cover its outer periphery. As shown best in FIG. 5, the balloon 72 is constituted of a freely contractible elastic material and has an appropriate number of valves (check valves) 76 provided thereon. As shown in FIG. 5, each valve 76 is constituted of a valve body 76a airtightly bonded to the edge of an opening formed in the balloon 72 via an elastic member 77, a plate 76b airtightly and slidably accommodated inside the valve body 76a, and a spring 76c which urges the plate 76b into the illustrated position. The valve body 76a and the plate 76b are circular in plan view. The valve body 76a is formed at a number of locations with windows 76d. A shoulder 76e is provided to project inward at the lower part of the valve body 76a for receiving the plate 76b. The upper part of the valve body 76a is provided with a clip 76g. The clip 76g is omega-shaped in plan view and is partly inserted in a groove formed at the inner wall of the valve body 76a so as to slightly projecting along the inner wall. A second plate 76f is rested on the projection at its inner side to close the upper end of the valve body 76a and sandwiches the spring 76c with the plate 76b.

When the impact absorber 70 of the aforesaid configuration collides with an external object 100, e.g. with a structural member or a worker in the working environment, the balloon 72 is deformed as indicated by the phantom lines in FIG. 5. The increase in the pressure of the compressed air in the balloon 72 pushes the plate 76b upward against the force of the spring 76c so that the windows 76d are opened and the compressed air can escape to the exterior. Thus, by appropriately selecting the number of the valves 76 and the force of the springs 76c provided thereat, it becomes possible to absorb the impact produced by collision with the external object 100. As a result, the impacts received by both the robot 1 and the external object 100 can be mitigated. The balloon 72 is made ready for reuse by replacing the discharged air.

While the embodiment was explained with respect to a case in which the impact absorber 70 (the balloon 72) is provided around the whole periphery of the main unit 24, it can alternatively be provided only at specific portions thereof, such as at the corners, or can be provided at the legs 2 in addition or instead. Further, although air is used as the medium, it is alternatively possible to use any other fluid medium such as oil. Moreover, although the balloon 72 having a single airtight chamber is used, it is also possible to use other cushioning members having a plurality of chambers or a honeycomb structure or a cushioning member made of a foam material and the like.

Figure 6:
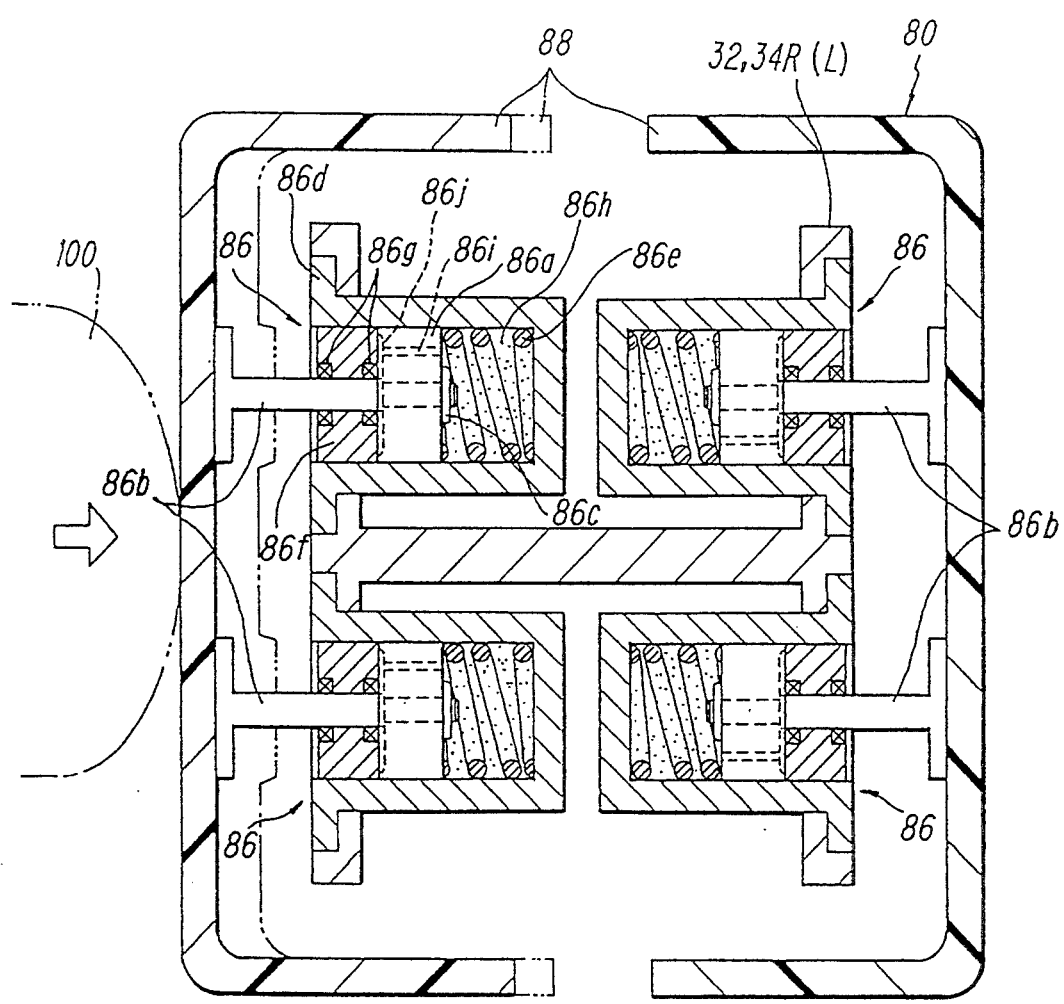
FIG. 6 is a sectional view taken along the line of VI—VI of FIG. 3 showing the detailed structure of another impact absorber according to the second embodiment of the invention.

A second embodiment of the invention will next be explained. As shown in FIGS. 3 and 4, an impact absorber 80 of the second embodiment is installed on the thigh links 32R (L) and the crus links 34R (L). FIG. 6 is a detailed sectional view of the impact absorber 80 taken along line VI—VI. While the following explanation relates to the impact absorber 80 installed on a thigh link, the same can also be used on a crus link 34R (L).

The impact absorber 80 shown in FIG. 6 is built in a thigh link 32R (L) of H-shaped sectional configuration and is made up of two damper units 86, which are disposed in alignment on either side of the link. Each damper unit 86 has a cylinder 86d, a piston head 86a slidably fitted in the cylinder 86d and a piston rod 86b having the piston head 86a is fixed to its one end by a lock nut 86c. A first chamber 86h defined inward of the piston head 86a in the cylinder 86d and a second chamber 86j defined between the outer end of the piston head 86a and a cap 86f closing the mouth of the cylinder 86d are in communication with each other via a passage 86i formed in the piston head 86a. A spring 86e is disposed in the first chamber 86h for urging the piston head 86a into the illustrated position in contact with the cap 86f. The first chamber 86h is charged with a fluid such as an oil. The free ends of the piston rods 86b are enlarged into a disk-like configuration and a cushioning cover 88 is fitted around the damper units 86 and attached to the disk-like ends of the piston rods 86b. (Reference symbol 86g indicates oil seals.)

When the impact absorber 80 of the aforesaid configuration collides with the external object 100, the cover 88 retracts as indicated by the phantom line in FIG. 6, causing the piston rods 86b of the damper units 86 on the affected side to thrust into the cylinders 86d against the force of the springs 86e. As a result, the oil in the first chamber 86h passes through the passages 86i into the second chambers 86j. Thus, by selecting the diameter of the passages 86i to be appropriate for the volume of the first chamber and selecting springs 86e of appropriate force, it becomes possible to moderate the external force produced by collision with the external object 100 and thus to mitigate the impact. As in the first embodiment, therefore, it is possible to absorb and mitigate the impact received by both the robot 1 and the object or person collided with. The absorber can use air or the like as the fluid instead of oil. The absorber can be provided only on the thigh links, only on the crus links, or on both. It can also be provided on the main unit 24.

Figure 7:
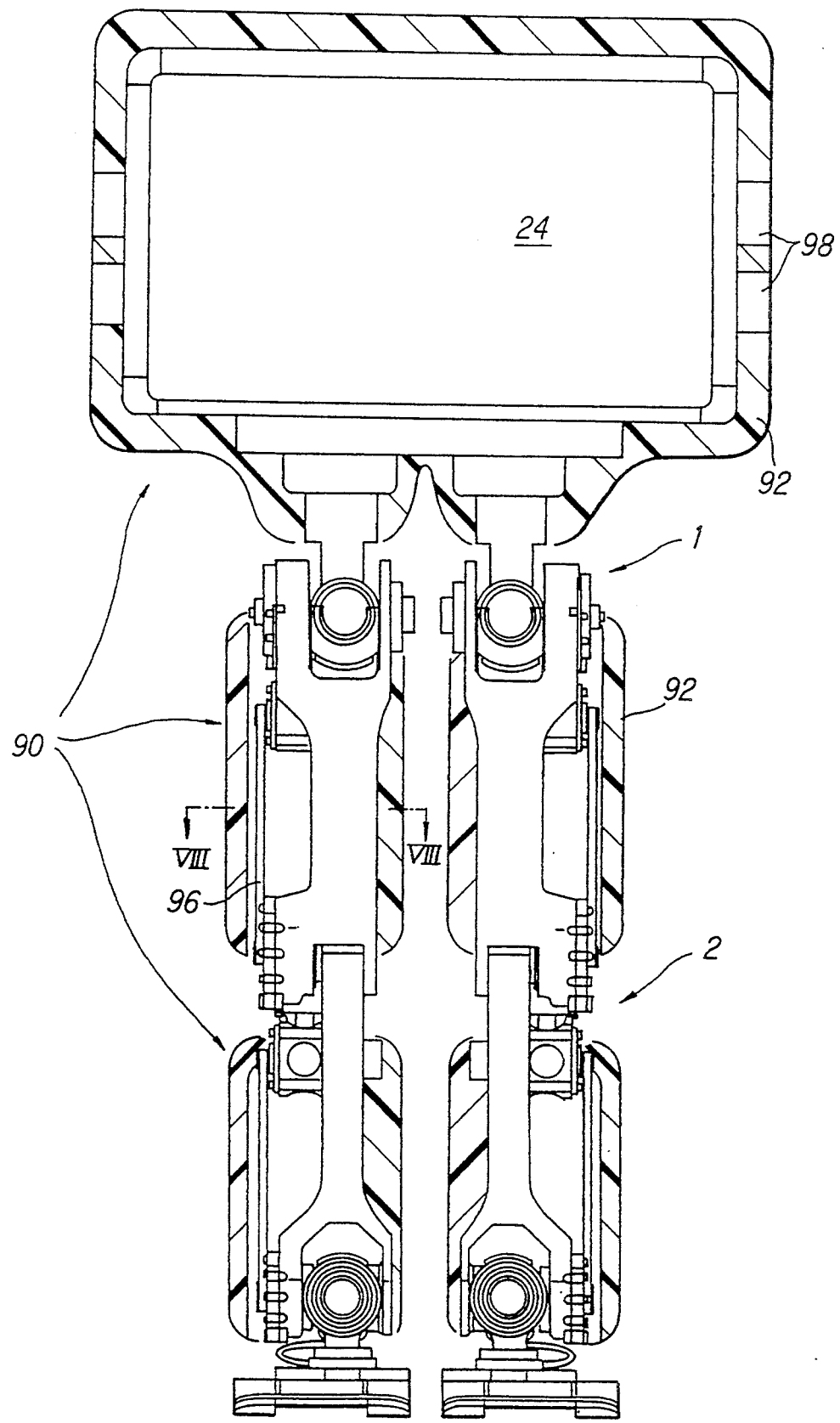
FIG. 7 is a view similar to FIG. 3, but shows a third impact absorber according to a third embodiment of the invention.
Figure 8:
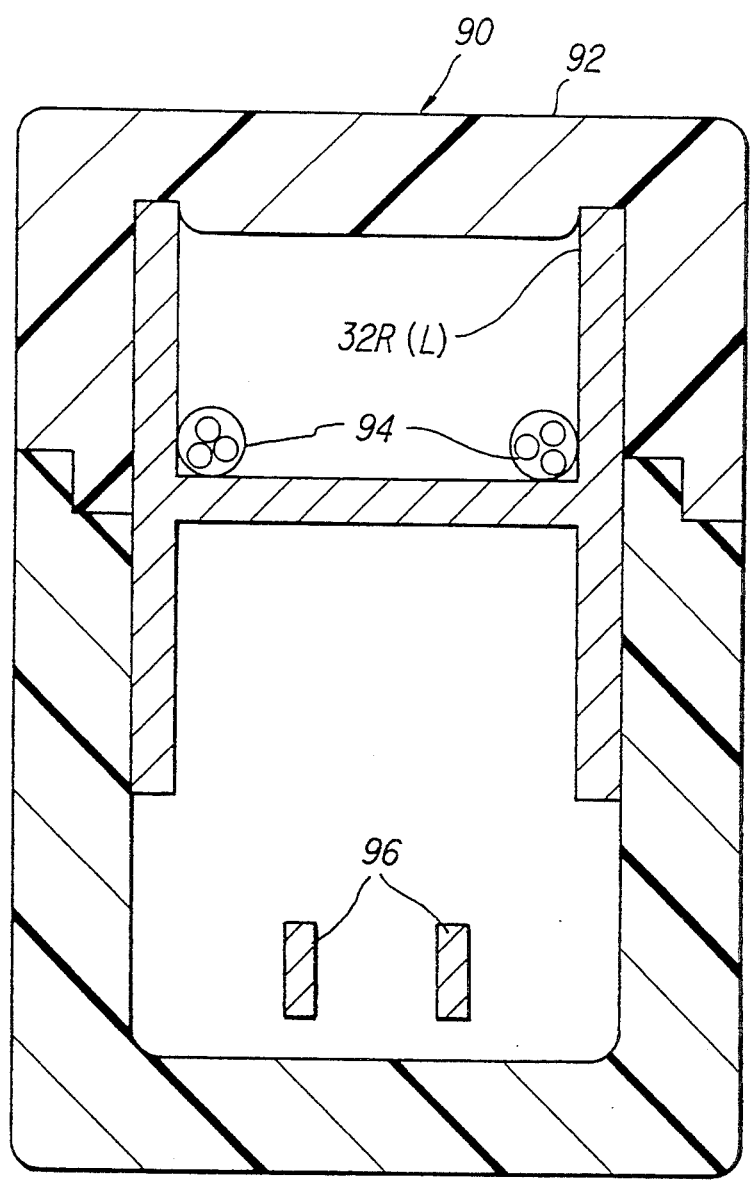
FIG. 8 is a sectional view taken along the line of VIII—VIII of FIG. 7.

FIG. 7, which is a front view, partially in section, of the robot 1 earlier mentioned, but is equipped with an impact absorber 90 according to a third embodiment of the invention. In this third embodiment, substantially all of the robot 1 is coated with the impact absorber 90 constituted as a resilient (cushioning) member 92 made of a hard urethane foam material. Further, as shown in FIG. 8 (a sectional view taken along line VIII—VIII in FIG. 7), the resilient member 92 is applied to the thigh link 32R (L) so as to enclose wires 94 carrying motor current for the knee joint and on or a signal for controlling the motor operation from the battery or the control unit 24 housed in the robot body 24. The configuration is similar at the crus link 34R (L). Reference numeral 96 designates belts for transmitting motor power to the knee joint. The main unit 24 is provided at appropriate locations with heat vents 98, as illustrated in FIG. 7, for passing heat from the electronic components housed therein to the exterior.

In the third embodiment, thus, when the resilient member disposed on the main unit 24 or the leg 2 comes into contact with an external object, it is deformed to absorb and mitigate the impact arising from the contact. Moreover, since the wiring and the like are enclosed by the resilient member, they are protected from damage by the contact. While the third embodiment was described with respect to a case in which substantially the whole robot is covered with the resilient member, it is also possible to apply the resilient member only to limited portions such as the main unit 24.

Figure 9:
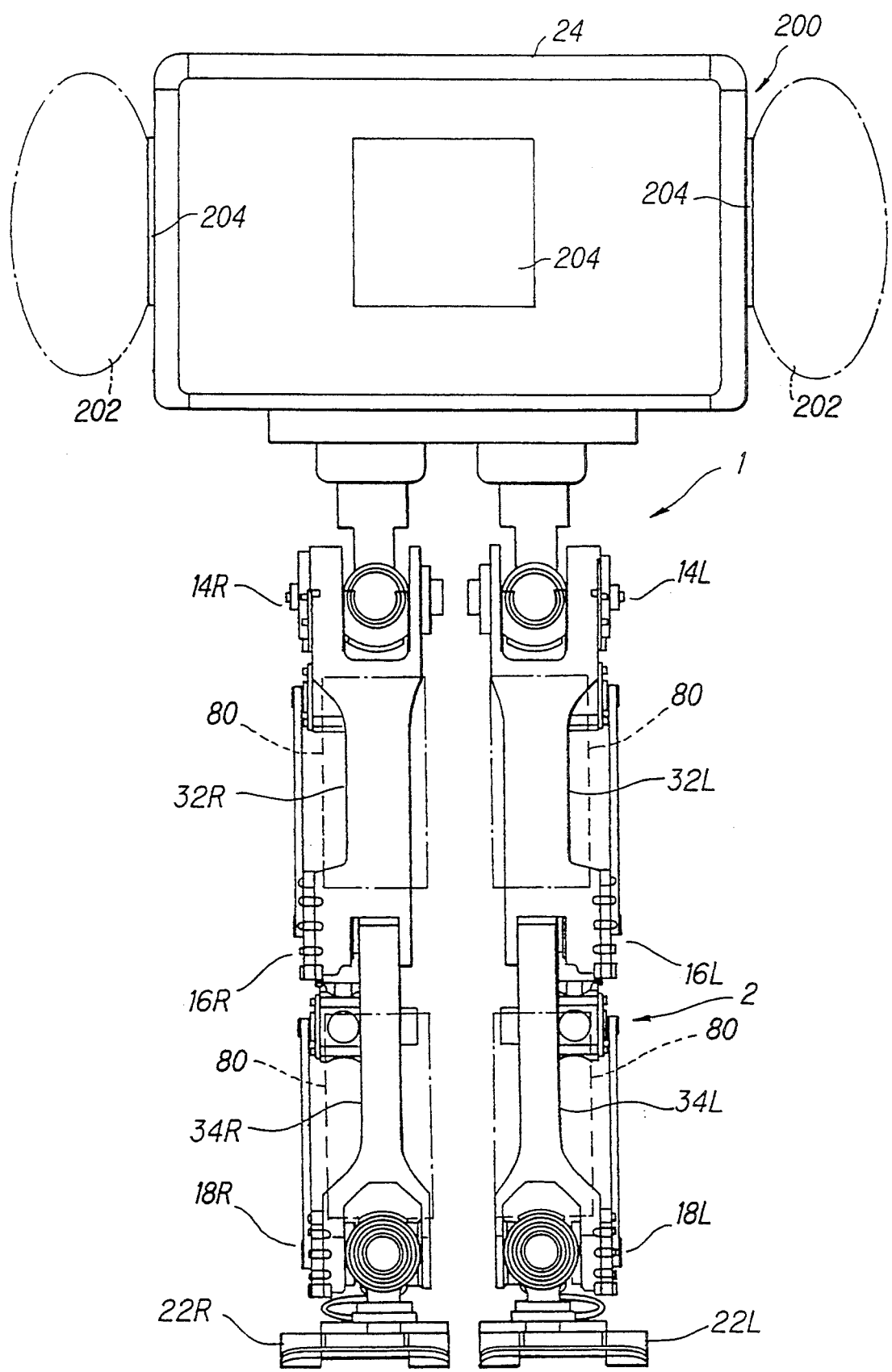
FIG. 9 is a view, similar to FIG. 3, but shows a fourth impact absorber according to a fourth embodiment of the invention.

FIG. 9 shows a fourth impact absorber 200 according to a fourth embodiment of the invention, in which four air bag systems are provided around the robot body 24, i.e., at the left and right sides and fore and aft sides of the robot body 24. Each air bag system comprises a bag 202 and an inflator 204 and its structure is basically the same as that used in a vehicle. A control circuit for the air bag system is shown at the bottom of the block diagram of FIG. 2. In the control unit 26, the aforesaid second processor 62 controls the operation. The bags 202 are normally housed in the inflators 204.

Figure 10:
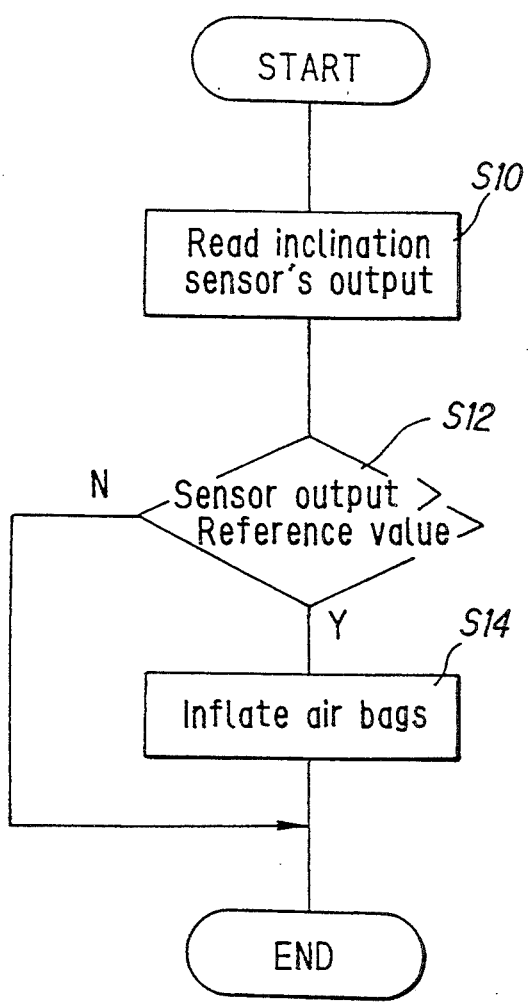
FIG. 10 is a flow chart showing the operation of the fourth impact absorber illustrated in FIG. 9.

The operation will then be explained with reference to a flow chart of FIG. 10. First in step S10, the output of the inclination sensor 40 is read. The sensor output indicates the robot body's inclination angle and angular velocity relative to the vertical direction as mentioned earlier. Control next advances to step S12 in which the sensor output is compared with a reference value. The reference value is preset in advance to be a value indicative of the possibility of robot's turnover. When it is found in step S12 that the sensor output exceeds the reference value, since this means that the robot is anticipated to be turned over, control passes to step S14 in which a ignition command is sent to an igniter (not shown in any figure) of the inflator 204 through an output circuit 206. As a result, an explosive powder of boron potassium nitrate filled at both sides of the igniter burns explosively and causes the bag 202 to be inflated as illustrated in FIG. 9 by phantom lines (only the right and left bags are illustrated in the figure). When the result at step S14 is negative, control immediately terminates the program.

Here, the configuration of the air bag system illustrated is basically the same as that used in a vehicle, as explained before. However, since the air bag system illustrated is provided to minimize an impact generated when the robot loses its balance and turns over by its own weight, it is arranged such that the bags deflate, once inflated, slowly if compared with that used in a vehicle, so as to enable the robot body to make a soft landing on the floor. With the arrangement, thus, the robot and the floor can be prevented from being damaged. Moreover, since the bags 202 are normally housed in the inflators 204, the robot's walking at a narrow working space will not be restricted.

Here, it should be noted that although the four air bag systems are provided around the robot body in the embodiment, it is alternatively possible to provide only one or five or more air bag systems around the robot body. Further, it is also possible to provide the air bag system at the robot legs.

The invention was described with reference to the first to fourth embodiments. It should be noted that the four different types of impact absorber described in the foregoing can be used independently or in combination.

Further, while the invention was described with reference to a biped walking robot as an example of a legged mobile robot, the invention can not be applied to other legged mobile robot having one leg or three legs or more.

Furthermore, the present invention has thus been shown and described with reference to the specific embodiments. However, it should be noted that the invention is in no way limited to the details of the described arrangements, changes and modifications may be made without departing from the scope of the appended claims.

What is claimed is:

1. A mobile robot comprising:
   a body;
   legs attached to the body; and
   an impact absorber on the robot having a member displaceable from an initial position when a force other than a ground reaction force acts on the robot, to absorb impact.

2. A robot according to claim 1 wherein the member comprises an inflatable member filled with a fluid; and further comprising
   means for deflating the inflatable member when it comes into contact with a foreign object so as to absorb impact arising from the contact.

3. A robot according to claim 2, wherein the means for deflating is a check valve provided for relieving the fluid from the balloon.

4. A robot according to claim 3, wherein the check valve comprises:
   a hollow valve body having an inlet communicated with the interior of the balloon and an outlet communicated with the exterior of the balloon;
   a plate disposed in the hollow valve body; and
   a spring urging the plate at a first position in which the plate is placed between the inlet and outlet of the hollow valve body, whereby, when the balloon comes into contact with the foreign object, the plate is displaced to a second position by the fluid to deflate the balloon so as to absorb impact arising from the contact.

5. A robot according to claim 2, wherein the robot has a projecting portion and the impact absorber is disposed on the projecting portion of the robot.

6. A robot according to claim 1, wherein the impact absorber is disposed on the body.

7. A robot according to claim 6, wherein the impact absorber is doughnut-shaped and is disposed around the body.

8. A mobile robot comprising:
a body;
at least two legs attached to the body; and
a piston slidably disposed in the cylinder the piston and cylinder forming a first chamber at a first end of the cylinder
a fluid filled in the chamber; and
a cover attached to the piston.

9. A robot according to claim 1, further including:
means for causing the member to be returned toward the initial position.

10. A robot according to claim 8 further comprising a second chamber formed by the cylinder and the piston, at a second end of the cylinder, with the second chamber separated from the first chamber by the piston; and
a passageway through the piston connecting the first chamber and the second chamber 11. A robot according to claim 10, further including:
a spring disposed in the first chamber urging the piston toward the second end of the cylinder.

12. A robot according to claim 8, wherein the impact absorber is disposed on at least one of the legs.

13. A robot according to claim 1, wherein the impact absorber comprises a resilient member.

14. A robot according to claim 13, wherein the resilient member comprises hard urethane foam.

15. A robot according to claim 13, wherein the member covers a wire carrying a current for a robot component.

16. A robot according to claim 1, wherein the impact absorber is disposed on the legs of the robot.

17. A robot according to claim 13, further comprising a heat vent extending through the resilient member.

18. A mobile robot comprising:
a body;
legs attached to the body;
an impact absorber including at least one air bag on the robot;
first means for detecting an unstable condition of the robot; and
second means for inflating the at least one air bag when the unstable condition is detected.

19. A robot according to claim 18, wherein said first means detects an unstable condition of the robot from an inclination of the robot.

20. A robot according to claim 19, wherein said second means inflates the at least one air bag when the robot's inclination is found to exceed a reference value.

21. A robot according to claim 18, wherein the impact absorber is disposed on the robot body.

22. A robot according to claim 21, wherein a plurality of air bags are provided around the robot body.

23. A legged mobile robot having an impact absorber, comprising:
an inflatable member on the robot filled with a fluid; and
means for deflating the inflatable member when it comes into contact with an object, to absorb impact arising from the contact.

24. A mobile robot, comprising:
a body;
a plurality of legs attached to the body;
an air bag on the body;
detecting means for detecting an unstable condition of the robot; and
inflating means for inflating the air bag when an unstable condition is detected.

25. The mobile robot according to claim 24 further comprising an air bag on at least one of the plurality of legs.

* * * * *